United States Patent
Yokote et al.

(10) Patent No.: US 9,748,565 B2
(45) Date of Patent: Aug. 29, 2017

(54) NON-AQUEOUS ELECTROLYTE SECONDARY BATTERY

(75) Inventors: Tatsunori Yokote, Otokuni-gun (JP); Mitsuhiro Kishimi, Otokuni-gun (JP)

(73) Assignee: HITACHI MAXELL, LTD., Ibaraki-Shi, Osaka (JP)

(*) Notice: Subject to any disclaimer, the term of this patent is extended or adjusted under 35 U.S.C. 154(b) by 207 days.

(21) Appl. No.: 13/702,974

(22) PCT Filed: Mar. 9, 2012

(86) PCT No.: PCT/JP2012/056155
§ 371 (c)(1),
(2), (4) Date: Dec. 7, 2012

(87) PCT Pub. No.: WO2013/132657
PCT Pub. Date: Sep. 12, 2013

(65) Prior Publication Data
US 2013/0236780 A1     Sep. 12, 2013

(51) Int. Cl.
*H01M 4/485* (2010.01)
*H01M 4/505* (2010.01)
(Continued)

(52) U.S. Cl.
CPC .......... *H01M 4/485* (2013.01); *H01M 4/131* (2013.01); *H01M 4/505* (2013.01); *H01M 4/525* (2013.01);
(Continued)

(58) Field of Classification Search
CPC ........ H01M 4/48; H01M 4/485; H01M 4/505; H01M 4/52; H01M 4/525
See application file for complete search history.

(56) References Cited

U.S. PATENT DOCUMENTS

| 2002/0028380 A1 | 3/2002 | Tanjo et al. |
| 2004/0121236 A1 | 6/2004 | Shen et al. |

(Continued)

FOREIGN PATENT DOCUMENTS

| CN | 1538542 A | 10/2004 |
| CN | 1581561 A | 2/2005 |

(Continued)

OTHER PUBLICATIONS

International Search Report mailed Jun. 12, 2012, issued in PCT/JP2012/056155.

(Continued)

*Primary Examiner* — Stewart Fraser
*Assistant Examiner* — Rachel L Zhang
(74) *Attorney, Agent, or Firm* — Birch, Stewart, Kolasch & Birch, LLP

(57) ABSTRACT

A non-aqueous electrolyte secondary battery including a positive electrode, a negative electrode, a non-aqueous electrolyte, and a separator, wherein the positive electrode includes a positive electrode current collector and a positive electrode material mixture layer formed on one or both sides of the positive electrode current collector, the positive electrode material mixture layer has a thickness greater than 80 μm per side of the positive electrode current collector, the positive electrode material mixture layer includes a positive electrode active material, the positive electrode active material is composed of secondary particles formed by aggregation of primary particles, the secondary particles have an average particle size of 6 μm or less, and, when diffraction-line integrated intensities of the (003) plane and the (104) plane in an X-ray diffraction chart of the positive electrode material mixture layer are I003 and I104, respectively, the ratio I003/I104 of the integrated intensities is 1.1 or more.

2 Claims, 2 Drawing Sheets

(51) Int. Cl.
*H01M 4/525* (2010.01)
*H01M 4/131* (2010.01)
*H01M 4/62* (2006.01)
*H01M 4/36* (2006.01)
*H01M 4/38* (2006.01)
*H01M 4/40* (2006.01)

(52) U.S. Cl.
CPC ............ *H01M 4/62* (2013.01); *H01M 4/36* (2013.01); *H01M 4/38* (2013.01); *H01M 4/382* (2013.01); *H01M 4/405* (2013.01)

(56) References Cited

U.S. PATENT DOCUMENTS

| | | |
|---|---|---|
| 2004/0191161 A1 | 9/2004 | Wang et al. |
| 2004/0223906 A1 | 11/2004 | Wang et al. |
| 2004/0258986 A1 | 12/2004 | Shen et al. |
| 2005/0037263 A1 | 2/2005 | Wang et al. |
| 2005/0048360 A1 | 3/2005 | Wang |
| 2005/0048361 A1 | 3/2005 | Wang et al. |
| 2005/0053545 A1 | 3/2005 | Liu et al. |
| 2005/0084750 A1 | 4/2005 | Wang et al. |
| 2005/0130042 A1 | 6/2005 | Liu et al. |
| 2008/0020280 A1 | 1/2008 | Miura et al. |
| 2010/0310934 A1* | 12/2010 | Yang et al. ............ 429/221 |
| 2011/0091756 A1* | 4/2011 | Suzuki et al. ............ 429/94 |
| 2011/0104569 A1* | 5/2011 | Sugaya et al. ............ 429/220 |

FOREIGN PATENT DOCUMENTS

| | | |
|---|---|---|
| JP | 11-154509 A | 6/1999 |
| JP | 2000-67850 A | 3/2000 |
| JP | 2000-195514 A | 7/2000 |
| JP | 2002-151055 A | 5/2002 |
| JP | 2002-359006 A | 12/2002 |
| JP | 2002-367610 A | 12/2002 |
| JP | 2003-168434 A | 6/2003 |
| JP | 2003-223887 A | 8/2003 |
| JP | 2008-47512 A | 2/2008 |
| JP | 2009-110767 A | 5/2009 |
| JP | 2011-54483 A | 3/2011 |

OTHER PUBLICATIONS

Office Action mailed Aug. 23, 2012, issued in corresponding JP 2012-522308.

Chinese Office Action and Search Report, issued Feb. 25, 2015, for Chinese Application No. 201280001647.5.

Yue et al., "Synthesis and Electrochemical Performance of Microsize $LiNi_{0.8}Co_{0.1}Mn_{0.1}O_2$ Cathode Material," The Chinese Journal of Nonferrous Metals, vol. 21, No. 7, Jul. 2011, pp. 1601-1606, along with an English abstract.

* cited by examiner

NON-AQUEOUS ELECTROLYTE SECONDARY BATTERY

TECHNICAL FIELD

The present invention relates to a non-aqueous electrolyte secondary battery such as a lithium ion secondary battery.

BACKGROUND ART

Non-aqueous electrolyte secondary batteries, as typified by lithium ion secondary batteries, are characterized by having high energy density, and thus are widely used as power sources for portable devices, including, for example, mobile phones and notebook personal computers. The capacity of lithium ion secondary batteries is likely to increase further as the performance of portable devices is enhanced. Accordingly, the research and development for further increasing the energy density is underway.

Meanwhile, with the recent enhancement of the performance of non-aqueous electrolyte secondary batteries, non-aqueous electrolyte secondary batteries have begun to be used as power sources other than those for portable devices. For example, non-aqueous electrolyte secondary batteries have begun to be used also as power sources for automobiles and motorcycles, and power sources for moving objects such as robots. In the case of using non-aqueous electrolyte secondary batteries as power sources for automobiles and motorcycles, and power sources for moving objects such as robots, it is necessary to further increase the capacity.

One example of the methods for increasing the capacity of non-aqueous electrolyte secondary batteries is a method involving increasing the thickness of an electrode material mixture layer. However, simply increasing the thickness of the electrode material mixture layer may lead to a capacity decrease during high-output charging and discharging. One of the reasons for this seems to be that there will be an increased amount of the active material whose distance from the current collector increases as the thickness of the electrode material mixture layer is increased, and thus the conductivity within the electrode is reduced.

Meanwhile, for example, Patent Document 1 proposes a method involving coating a positive electrode active material with a silane compound and a conductivity enhancing agent as a method for increasing the conductivity within the electrode.

PRIOR ART DOCUMENT

Patent Document

Patent Document 1: JP 2002-367610A

DISCLOSURE OF INVENTION

Problem to be Solved by the Invention

However, when the method described in Patent Document 1 is applied to a non-aqueous electrolyte secondary battery including an electrode material mixture layer having a large thickness, there is the problem that the amounts of the silane compound and the conductivity enhancing agent that do not contribute to the discharge capacity increase, resulting in a decrease in the energy density.

The present invention solves the above-described problem, and provides a non-aqueous electrolyte secondary battery that is excellent in high-output charge/discharge characteristics and charge/discharge cycle characteristics.

Means for Solving Problem

A non-aqueous electrolyte secondary battery of the present invention is a non-aqueous electrolyte secondary battery including a positive electrode, a negative electrode, a non-aqueous electrolyte, and a separator, wherein the positive electrode includes a positive electrode current collector and a positive electrode material mixture layer formed on one or both sides of the positive electrode current collector, the positive electrode material mixture layer has a thickness greater than 80 μm per side of the positive electrode current collector, the positive electrode material mixture layer includes a positive electrode active material, the positive electrode active material is composed of secondary particles formed by aggregation of primary particles, the secondary particles have an average particle size of 6 μm or less, and, when diffraction-line integrated intensities of the (003) plane and the (104) plane in an X-ray diffraction chart of the positive electrode material mixture layer are $I_{003}$ and $I_{104}$, respectively, the ratio $I_{003}/I_{104}$ of the integrated intensities is 1.1 or more.

Effects of the Invention

According to the present invention, it is possible to provide a non-aqueous electrolyte secondary battery that is excellent in high-output charge/discharge characteristics and charge/discharge cycle characteristics.

DESCRIPTION OF THE INVENTION

Figure 1:
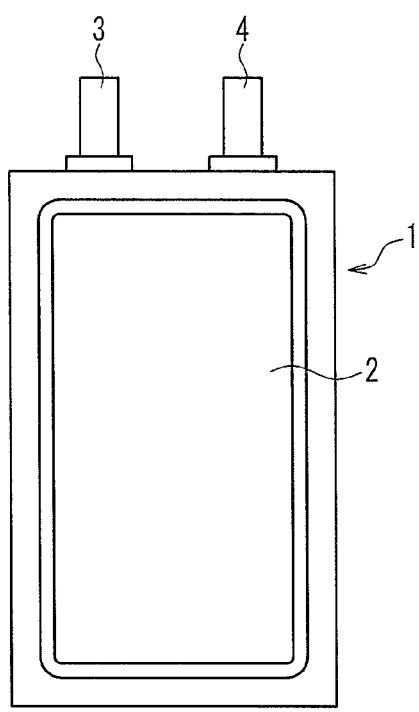
FIG. 1 is a plan view showing an example of a non-aqueous electrolyte secondary battery of the present invention.

A non-aqueous electrolyte secondary battery of the present invention includes a positive electrode, a negative electrode, a non-aqueous electrolyte, and a separator. The positive electrode includes a positive electrode current collector and a positive electrode material mixture layer formed on one or both sides of the positive electrode current collector, and the positive electrode material mixture layer has a thickness that is set to be greater than 80 μm per side of the positive electrode current collector. Furthermore, the positive electrode material mixture layer includes a positive electrode active material, and the positive electrode active material is composed of secondary particles formed by aggregation of primary particles. The secondary particles have an average particle size of 6 μm or less, and, when diffraction-line integrated intensities of the (003) plane and the (104) plane in an X-ray diffraction chart of the positive electrode material mixture layer are $I_{003}$ and $I_{104}$, respectively, the ratio $I_{003}/I_{104}$ of the integrated intensities is set to 1.1 or more.

Due to the thickness of the positive electrode material mixture layer being set to be greater than 80 μm per side of the positive electrode current collector, it is possible to increase the capacity of the non-aqueous electrolyte secondary battery of the present invention. Further, due to the positive electrode material mixture layer including positive electrode active material particles having an average particle size of secondary particles of 6 μm or less and the ratio $I_{003}/I_{104}$ of the integrated intensities in an X-ray diffraction chart of the positive electrode material mixture layer being set to 1.1 or more, it is possible to provide a non-aqueous electrolyte secondary battery that is excellent in high-output charge/discharge characteristics and charge/discharge cycle characteristics.

Hereinafter, a description will be given of configurations of a non-aqueous electrolyte secondary battery of the present invention, showing a lithium ion secondary battery as an example.

Positive Electrode

As a positive electrode used for a non-aqueous electrolyte secondary battery of the present invention, it is possible to use, for example, a positive electrode including a positive electrode material mixture layer containing a positive electrode active material, a conductivity enhancing agent, a binder, and so forth on one or both sides of a current collector. Preferably, the positive electrode material mixture layer further includes an organosilane compound.

Positive Electrode Active Material

The positive electrode active material is composed of secondary particles formed by aggregation of primary particles, the secondary particles have an average particle size of 6 μm or less, and, when diffraction-line integrated intensities of the (003) plane and the (104) plane in an X-ray diffraction chart are $I_{003}$ and $I_{104}$) respectively, the ratio $I_{003}/I_{104}$ of the integrated intensities is 1.1 or more. Thereby, it is possible to provide a non-aqueous electrolyte secondary battery that is excellent in high-output charge/discharge characteristics and charge/discharge cycle characteristics. A greater ratio of the integrated intensities $I_{003}/I_{104}$ indicates a higher crystallinity of the positive electrode active material, and the upper limit value is about 1.3.

By setting the ratio $I_{003}/I_{104}$ of the integrated intensities of the positive electrode active material in the above-described range, the ratio $I_{003}/I_{104}$ of the integrated intensities when diffraction-line integrated intensities of the (003) plane and the (104) plane in an X-ray diffraction chart of the positive electrode material mixture layer are $I_{003}$ and $I_{104}$, respectively, virtually can be set to 1.1 or more.

Although there is no particular limitation with respect to the positive electrode active material as long as it is capable of absorbing and desorbing lithium, the positive electrode active material is preferably made of a lithium-containing composite oxide including, as constituent elements, nickel (Ni) and at least one selected from cobalt (Co) and manganese (Mn) and having a layered structure. Ni and Co contribute to an increase in the battery capacity, and Mn contributes to an increase in the thermal stability of the lithium-containing composite oxide.

In view of other characteristics in the positive electrode active material, including, for example, the stability at high potentials, it is particularly preferable to use a lithium-containing composite oxide represented by the following general compositional formula (1) as the above-described lithium-containing composite oxide.

$$Li_{1+x}MO_2 \qquad (1)$$

In the general compositional formula (1), x is in the range of −0.5≤x≤0.5, and M includes Ni and at least one selected from Co and Mn. 20≤a≤100 and 50≤a+b+c≤100 are satisfied when the ratios of Ni, Co, and Mn to all the elements constituting M are a, b, and c, respectively, in units of mol %.

From the viewpoint of increasing the capacity of the lithium-containing composite oxide, the ratio a of Ni is preferably 20 mol % or more, more preferably 50 mol % or more, when the total amount of elements of the element group M in the general compositional formula (1), representing the lithium-containing composite oxide, is taken as 100 mol %. Further, from the viewpoints of increased capacity and the thermal stability, the lithium-containing composite oxide preferably has a total of the Ni ratio a, the Co ratio b, and the Mn ratio c of 50 mol % or more, and M may include Ni, Co, and Mn only.

Co contributes to the capacity of the lithium-containing composite oxide and serves to increase the packing density in the positive electrode material mixture layer, but it may result in increased cost and reduced safety if the amount is too large. Accordingly, the ratio b of Co is preferably 5 mol % or more and 35 mol % or less, when the total amount of elements of the element group M in the general compositional formula (1), representing the lithium-containing composite oxide, is taken as 100 mol %.

The ratio c of Mn is preferably 5 mol % or more and 35 mol % or less, when the total amount of elements of the element group M in the general compositional formula (1) is taken as 100 mol %. By including Mn in the above-described amount in the lithium-containing composite oxide so as to have Mn necessarily present in a crystal lattice, the thermal stability of the lithium-containing composite oxide can be increased, thus making it possible to construct an even safer battery.

The element group M in the general compositional formula (1) representing the lithium-containing composite oxide may include an element other than Ni, Co, and Mn, and may include, for example, Mg, Ti, Cr, Fe, Cu, Zn, Al, Ge, Sn, Ag, Ta, Nb, Mo, B, P, Zr, Ga, Ba, Sr, Ca, Si, W, and S. However, in order to achieve the effects of the present invention sufficiently, the ratio of the element other than Ni, Co, and Mn is preferably 2.0 mol % or less, more preferably 1.0 mol % or less, when the total amount of elements of the element group M is taken as 100 mol %. The element other than Ni, Co, and Mn of the element group M may be uniformly distributed in the lithium-containing composite oxide, or may be segregated to the particle surface or the like.

The lithium-containing composite oxide has a large true density particularly when it has a composition close to the stoichiometric ratio, and it is therefore preferable that −0.5≤x≤0.5 is satisfied in the general compositional formula (1). Adjusting the value of x in this manner makes it possible to increase the true density and the reversibility. More preferably, x is −0.3 or more and 0.3 or less. In this case, the lithium-containing composite oxide can have a higher value of true density.

The positive electrode active material is composed of secondary particles formed by aggregation of primary particles, and the average particle size of the secondary particles is 6 μm or less, as described above. Thereby, the specific surface area of the positive electrode active material is increased, which enhances the high-output charge/discharge characteristics in particular. There is no particular limitation with respect to the lower limit of the average particle size of the secondary particles, and usually, it is about 1 μm. Although there is also no particular limitation with respect to the average particle size of the primary particles, it is preferable that A/B is 0.1 or less when the average particle size of the primary particles is A and the average particle size of the secondary particles is B. When A/B is greater than 0.1, the number of the primary particles constituting the secondary particles is decreased, and thus the secondary particles tend to be disintegrated.

In the present invention, an average particle size refers to D50, which is a value of the particle diameter with a volume-based accumulated volume percentage of 50%. For example, a laser diffraction scattering method or the like can be used as the method for measuring the particle diameter. Specifically, it is a measurement method of the particle size distribution that uses a scattering intensity distribution detected by applying laser light to an object to be measured dispersed in a liquid phase such as water. For example, a "Microtrac ERA" manufactured by NIKKISO CO., LTD. can be used as a particle size distribution measurement device using the laser diffraction scattering method.

Next, a method for producing the lithium-containing composite oxide will be described. It is very difficult to obtain the lithium-containing composite oxide in high purity by simply mixing and baking a Li-containing compound, a Ni-containing compound, a Co-containing compound, a Mn-containing compound, and the like. This is presumably because it is difficult to uniformly disperse Ni, Co, Mn, and the like during synthesis reaction of the lithium-containing composite oxide as they have a low diffusion speed in solids, making it difficult to uniformly distribute Ni, Co, Mn, and the like in the produced lithium-containing composite oxide.

When producing the lithium-containing composite oxide according to the present invention, it is preferable to employ, for example, a method involving baking a composite compound containing Ni, Co, Mn, and the like as constituent elements and a Li-containing compound. With this method, the lithium-containing composite oxide can be synthesized in high purity relatively easily. More specifically, a composite compound containing Ni, Co, Mn, and the like is previously synthesized, and the composite compound is baked together with a Li-containing compound. Thereby, Ni, Co, Mn, and the like are uniformly distributed during the oxide forming reaction, and the lithium-containing composite oxide is synthesized in even higher purity.

The method for producing the lithium-containing composite oxide according to the present invention is not limited to the method described above, but it is surmised that the physical properties, namely, the structure stability, the charge/discharge reversibility, the true density, and the like, of the produced lithium-containing composite oxide change significantly depending on which process was used to produce the lithium-containing composite oxide.

Here, examples of the composite compound containing Ni, Co, Mn, and the like include a coprecipitated compound, a hydrothermally synthesized compound, and a mechanically synthesized compound that include Ni, Co, and Mn, and a compound obtained by heat treating any of these compounds.

The coprecipitated compound can be obtained as a coprecipitated hydroxide of the constituent elements such as Ni, Co, and Mn, for example, by adding to and reacting with an aqueous alkali hydroxide solution, an aqueous solution in which sulfates, nitrates, or the like of these constituent elements are dissolved at a predetermined ratio.

Ammonia water having a pH adjusted to the range of about 10 to 13 with alkali hydroxide may be used in place of the aqueous alkali hydroxide solution. More specifically, with the temperature of the ammonia water maintained in the range of approximately 40 to 60° C., the above-described aqueous solution in which sulfates, nitrates, or the like are dissolved is gradually added to the ammonia water, while an aqueous alkaline solution is added such that the pH of the ammonia water is maintained in the above-described range, and thereby a coprecipitated compound is precipitated.

In the case of producing the lithium-containing composite oxide containing an element other than Ni, Co, and Mn as a part of the element group M (for example, at least one element selected from the group consisting of Mg, Ti, Cr, Fe, Cu, Zn, Al, Ge, Sn, Ag, Ta, Nb, Mo, B, P, Zr, Ga, Ba, Sr, Ca, Si, W, and S, which are hereinafter collectively referred to as an "element M"), the lithium-containing composite oxide can be produced, for example, by mixing and baking a composite compound containing Ni, Co, and Mn, a Li-containing compound, and an element M'-containing compound. However, if possible, it is preferable to use, for example, a composite compound containing Ni, Co, Mn, and also the element M'. The amount ratios of Ni, Co, Mn, and M' in the composite compound may be adjusted as appropriate according to the intended composition of the lithium-containing composite oxide.

As the Li-containing compound that can be used to produce particles of the lithium-containing composite oxide, various lithium salts can be used. Examples thereof include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, and lithium oxide. Among them, it is preferable to use lithium hydroxide monohydrate because it does not generate a gas that causes harm to the environment, such as carbon dioxide, nitrogen oxides or sulfur oxides.

As can be seen from the above, to produce the lithium-containing composite oxide, for example, first, a composite compound containing Ni, Co, and Mn, a Li-containing compound, and optionally an element M'-containing compound are mixed at a ratio substantially corresponding to the intended composition of the lithium-containing composite oxide. The resultant raw material mixture is then baked, for example, at 600 to 1000° C. for 1 to 24 hours, and thereby the lithium-containing composite oxide can be obtained.

Preferably, the atmosphere used to bake the above-described raw material mixture is an oxygen gas atmosphere. This makes it possible to reduce the amount of impurities contained in the produced lithium-containing composite oxide and increase the crystallinity, and thereby the above-described ratio $I_{003}/I_{104}$ of the integrated intensities can be 1.1 or more.

Conductivity Enhancing Agent

Any conductivity enhancing agent that is chemically stable in batteries may be used as the conductivity enhancing agent. Examples thereof include: graphites such as natural graphite and artificial graphite; carbon blacks such as acetylene black, Ketjen Black (trade name), channel black, furnace black, lamp black and thermal black; conductive fibers such as carbon fiber and metal fiber; metal powders such as aluminum powder; fluorocarbon; zinc oxide; conductive whisker made of potassium titanate or the like; conductive metal oxides such as titanium oxide; and organic conductive materials such as polyphenylene derivatives. These may be used alone or in a combination of two or more. Among them, it is preferable to use graphites, which have a high conductivity, or carbon blacks, which have excellent liquid absorbing capabilities. The configuration of the conductivity enhancing agent is not limited to primary particles, and it is also possible to use secondary agglomerates or aggregates such as chain structures. Such aggregates are easier to handle, and thus achieve good productivity.

The conductivity enhancing agent content is preferably 2 mass % or more and 10 mass % or less, relative to the total mass of the positive electrode material mixture layer. When the amount of the conductivity enhancing agent contained in the positive electrode material mixture layer is too large, the amount of the positive electrode active material is decreased correspondingly. When it is too small, the conductivity of the positive electrode material mixture layer is reduced.

Binder

Either thermoplastic resin or thermosetting resin may be used as the binder as long as it is chemically stable in batteries. Examples thereof include polyvinylidene fluoride (PVDF), polyethylene, polypropylene, polytetrafluoroethylene (PTFE), polyhexafluoropropylene (PREP), styrene butadiene rubber (SBR), tetrafluoroethylene-hexafluoroethylene copolymers, tetrafluoroethylene-hexafluoropropylene copolymers (FEPs), tetrafluoroethylene-perfluoroalkylvinylether copolymers (PFAs), ethylene-tetrafluoroethylene copolymers (ETFEs), polychlorotrifluoroethylene (PCTFE), propylene-tetrafluoroethylene copolymers, ethylene-chlorotrifluoroethylene copolymers (ECTFEs), or ethylene-acrylic acid copolymers, ethylene-methacrylic acid copolymers, ethylene-methyl acrylate copolymers, ethylene-methyl methacrylate copolymers, and Na ion crosslinked structures of these copolymers. One or more of these may be used.

The binder content is preferably 5.0 mass % or less, more preferably, 4.0 mass % or less, relative to the total mass of the positive electrode material mixture layer. The adhesion between the positive electrode material mixture layer and the current collector becomes too high when the amount of the binder in the positive electrode material mixture layer is too large, and therefore defects such as cracking tend to occur in the positive electrode material mixture layer on the inner circumferential side of a wound electrode assembly using the positive electrode.

From the viewpoint of increasing the positive electrode capacity, it is preferable to decrease the amount of the binder in the positive electrode material mixture layer to increase the positive electrode active material content. However, the flexibility of the positive electrode material mixture layer is reduced when the amount of the binder in the positive electrode material mixture layer is too small, and the shape (especially the shape on the outer circumferential side) of a wound electrode assembly using the positive electrode is degraded, which may reduce the productivity of the positive electrode and hence the productivity of the battery using the positive electrode. Further, when the amount of the binder in the positive electrode material mixture layer is too small, the adhesion of the positive electrode material mixture layer is reduced, which may cause, for example, the problem that the positive electrode material mixture layer is detached from the current collector and thus is removed in the form of powder during the formation of slits in the positive electrode. Therefore, the binder content is preferably 0.5 mass % or more, more preferably 1.0 mass % or more, relative to the total mass of the positive electrode material mixture layer.

Organosilane Compound

It is considered that the organosilane compound has the function of joining the positive electrode active material and the conductivity enhancing agent, and the inclusion of the organosilane compound in the positive electrode material mixture layer can enhance the conductivity of the positive electrode material mixture layer. Particularly, the conductivity of the positive electrode material mixture layer can be maintained even after the battery is stored at high temperatures, which makes it possible to enhance the high-temperature storage characteristics of the non-aqueous electrolyte secondary battery of the present invention.

The organosilane compound content is preferably 0.05 to 3.0 mass % relative to the total mass of the positive electrode material mixture layer. When the organosilane compound content is too small, the organosilane compound cannot achieve its effect. When the content is too large, the amount of the silane compound that does not contribute to the discharge capacity is increased, resulting in a decrease in the energy density of the battery. As described above, the positive electrode material mixture layer of the present invention includes a positive electrode active material having an average particle size of secondary particles of 6 μm or less, and the ratio $I_{003}/I_{104}$ of the integrated intensities when diffraction-line integrated intensities of the (003) plane and the (104) plane in an X-ray diffraction chart of the positive electrode material mixture layer are $I_{003}$ and $I_{104}$, respectively, is set to 1.1 or more. Accordingly, the conductivity of the positive electrode material mixture layer can be sufficiently enhanced even if the organosilane compound content is limited to the above-described range.

Examples of the organosilane compound include compounds represented by general formulas $X^1$—$Si(OR^1)_3$ and $X^2$—$SiR^2$ $(OR^3)_2$. In the above formulas, $R^1$, $R^2$, and $R^3$ represent —$CH_3$, —$C_2H_5$, or —$C_3H_7$, and $R^2$ and $R^3$ may be the same or different. Further, in the above general formulas, $X^1$ and $X^2$ represent various functional groups, which may be —$Si(OR^1)_3$ and —$SiR^2$ $(OR^3)_2$.

Examples of the organosilane compound include organosilane compounds including a vinyl group, such as vinyltrichlorosilane, vinyltrimethoxysilane, and vinyltriethoxysilane; organosilane compounds including an epoxy group, such as 2-(3,4-epoxycyclohexyl)ethyltrimethoxysilane, 3-glycidoxypropyltrimetoxysilane, 3-glycidoxypropylmethykliethoxysilane, and 3-glycidoxypropyltriethoxysilane; organosilane compounds including a styryl group, such as p-styryl trimethoxysilane; organosilane compounds including a methacryloxy group, such as 3-methacryloxypropylmethyldimethoxysilane, 3-methacryloxypropyltrimethoxysilane, 3-methacryloxypropylmethyldimethoxysilane, 3-methacryloxypropyl triethoxysilane; organosilane compounds including an acryloxy group, such as 3-acryloxypropyltrimethoxysilane; organosilane compound including an amino group, such as hydrochlorides of N-2-(aminoethyl)-3-aminopropylmethyldimethoxysilane, N-2-(aminoethyl)-3-aminopropyltrimethoxysilane, 3-aminopropyltriethoxysilane, 3-aminopropyltrimethoxysilane, 3-aminopropyltriethoxysilane, 3-triethoxy silyl-N-(1,3-dimethyl-butylidene)propylamine, N-phenyl-3-aminopropyltrimethoxysilane, and N-(vinylbenzyl)-2-aminoethyl 3-aminopropyltrimethoxysilane; organosilane compounds including an ureido group, such as 3-ureidopropyltriethoxysilane; organosilane compounds including a chloropropyl group, such as 3-chloropropyltrimetoxysilane; organosilane compounds including a mercapto group, such as 3-mercaptopropylmethyldimethoxysilane and 3-mercaptopropyltrimethoxysilane; organosilane compounds including a sulfide group, such as bis(triethoxysilylpropyl)tetrasulfide; and organosilane compounds including an isocyanate group, such as 3-isocyanatepropyltriethoxysilane.

The above-mentioned organosilane compounds may be used alone or in a combination of two or more. Among the organosilane compounds, those having a boiling point of 200° C. or higher are more preferable. Organosilane compounds having a boiling point of less than 200° C. may undergo volatilization during production of the positive electrode material mixture layer, thus possibly reducing the effect that would be obtained by the use of the organosilane compound.

Current Collector

Any current collectors as used for positive electrodes of conventionally known lithium ion secondary batteries can be used as the current collector. For example, it is preferable to use aluminum foil having a thickness of 10 to 30 μm.

Method for Producing Positive Electrode

The positive electrode can be produced, for example, through a process involving preparing a paste or slurry positive electrode material mixture-containing composition in which the above-described positive electrode active material, the conductivity enhancing agent, the binder, and the like are dispersed in a solvent such as N-methyl-2-pyrrolidone (NMP), applying the composition to one or both sides of a current collector, drying, and thereafter optionally performing calendering. The method for producing the positive electrode is not limited to the above-described method, and the positive electrode can also be produced by a different production method. In the case of using an organosilane compound, it is preferable that the positive electrode active material and the organosilane compound are previously mixed to coat the particles of the positive electrode active material with the organosilane compound.

Positive Electrode Material Mixture Layer

The thickness of the positive electrode material mixture layer is set such that the thickness after calendering is greater than 80 μm per side of the current collector. Although there is no particular limitation with respect to the upper limit of the thickness of the positive electrode material mixture layer, it is usually about 300 μm. By setting the thickness of the positive electrode material mixture layer in the above-described range and making it as thick as possible, it is possible to increase the capacity of the non-aqueous electrolyte secondary battery.

Negative Electrode

As the negative electrode used for the non-aqueous electrolyte secondary battery of the present invention, it is possible to use, for example, a negative electrode including a negative electrode material mixture layer including a negative electrode active material, a binder, and optionally a conductivity enhancing agent and the like on one or both sides of a current collector.

Negative Electrode Active Material

There is no particular limitation with respect to the negative electrode active material, as long as any of negative electrode active materials used for conventionally known lithium ion secondary batteries, or in other words, a material capable of absorbing and desorbing lithium ions, is used. As the negative electrode active materials, it is possible to use one of or a mixture of two or more of carbon-based materials capable of absorbing and desorbing lithium ions, such as graphites, pyrolytic carbons, cokes, glassy carbons, baked products of organic polymer compounds, mesocarbon microbeads (MCMB), and carbon fiber. It is also possible to use an element such as silicon (Si), tin (Sn), germanium (Ge), bismuth (Bi), antimony (Sb), or indium (In), an alloy thereof a compound capable of charging and discharging at a low voltage close to that of a lithium metal, such as a lithium-containing nitride or a lithium-containing oxide, a lithium metal, or a lithium/aluminum alloy as the negative electrode active material. Among them, a material represented by $SiO_y$, which includes silicon and oxygen as constituent elements, is preferable as the negative electrode active material.

$SiO_y$ may include microcrystalline Si or amorphous Si. In this case, the atomic ratio of Si and O is the ratio including the microcrystalline or amorphous Si. That is, $SiO_y$ may be a material having a structure in which Si (for example, microcrystalline Si) is dispersed in an amorphous $SiO_2$ matrix, and it is sufficient that the above-described atomic ratio x satisfies $0.5 \leq y \leq 1.5$ where this amorphous $SiO_2$ and Si dispersed therein are combined. For example, in the case of a material having a structure in which Si is dispersed in the amorphous $SiO_2$ matrix and the molar ratio of $SiO_2$ and Si is 1:1, y=1, and therefore the structural formula is represented as SiO. In the case of a material having such a structure, for example, any peak attributed to the presence of Si (microcrystalline Si) may not be observed by an X-ray diffraction analysis, but an observation with a transmission electron microscope can confirm the presence of fine Si.

The above-described $SiO_y$ preferably is a composite in which the $SiO_y$ is composited with a carbon material, and the surface of the $SiO_y$ is preferably coated with the carbon material, for example. Ordinarily, $SiO_y$ has poor conductivity. Thus, when using $SiO_y$ as the negative active material, it is necessary to form a favorable conductive network by using a conductive material (a conductivity enhancing agent) and favorably mixing and dispersing the $SiO_y$ and the conductive material in the negative electrode in terms of ensuring favorable battery characteristics. In the case of using a composite formed by compositing $SiO_y$ with a carbon material, a more favorable conductive network in the negative electrode can be formed than in the case of using a material obtained by simply mixing $SiO_y$ and a conductive material such as a carbon material.

Binder

Examples of the binder include: polysaccharides such as starch, polyvinyl alcohol, polyacrylic acid, carboxymethyl cellulose (CMC), hydroxypropyl cellulose, regenerated cellulose, and diacetyl cellulose, and modified forms of these polysaccharides; thermoplastic resins such as polyvinyl chloride, polyvinylpyrrolidone (PVP), polytetrafluoroethylene, polyvinylidene fluoride, polyethylene, polypropylene, polyamide imide, and polyamide, and modified forms of these thermoplastic resins; polyimide; elastic polymers such as ethylene-propylene-dieneter polymers (EPDMs), sulfonated EPDMs, styrene butadiene rubber (SBR), butadiene rubber, polybutadiene, fluorocarbon rubber, and polyethylene oxide, and modified forms of these elastic polymers. They can be used alone or in a combination of two or more.

Conductivity Enhancing Agent

A conductive material may be further added to the negative electrode material mixture layer as a conductivity enhancing agent. There is no particular limitation with respect to the conductive material as long as it does not undergo a chemical change in batteries, and it is possible to use one or more of materials such as carbon blacks (e.g., thermal black, furnace black, channel black, Ketjen Black, and acetylene black), carbon fiber, metal powder (powder of copper, nickel, aluminum, silver, or the like), metal fiber, and polyphenylene derivatives (those described in JP 59-20971A). Among them, carbon blacks are preferable, and Ketjen Black and acetylene black are particularly preferable.

Current Collector

As the current collector, a foil, a punched metal, a mesh, an expanded metal made of copper or nickel, and the like can be used. Usually, a copper foil is used. The negative electrode current collector preferably has an upper limit thickness of 30 μm when the overall thickness of the negative electrode is reduced to obtain a high energy density battery, and it desirably has a lower limit thickness of 5 μm in order to ensure the mechanical strength.

Method for Producing Negative Electrode

The negative electrode can be produced, for example, through a process involving preparing a paste or slurry negative electrode material mixture-containing composition in which the above-described negative electrode active material and the binder, and optionally the conductivity enhancing agent are dispersed in a solvent such as N-methyl-2-pyrrolidone (NMP) or water, applying the composition to one or both sides of a current collector, drying, and thereafter optionally performing calendering. The method for producing the negative electrode is not limited to the above-described method, and the negative electrode can also be produced by a different production method.

Negative Electrode Material Mixture Layer

It is preferable that, in the negative electrode material mixture layer, the total amount of the negative electrode active materials is 80 to 99 mass % and the amount of the binder is 1 to 20 mass %. In the case of separately using any conductive materials as the conductivity enhancing agent, it is preferable to use these conductive materials in the negative electrode material mixture layer in the range where the total amount of the negative electrode active materials and the amount of the binder satisfy the above-described suitable values. In view of the thickness of the above-described positive electrode material mixture layer, the thickness of the negative electrode material mixture layer is preferably 50 to 400 μm, for example.

Non-Aqueous Electrolyte

A non-aqueous electrolyte in which a lithium salt is dissolved in an organic solvent may be used as the non-aqueous electrolyte used for the non-aqueous electrolyte secondary battery of the present invention.

There is no particular limitation with respect to the lithium salt used for the non-aqueous electrolyte as long as it can dissociate in the solvent into lithium ion and tends not to cause a side reaction, such as decomposition, in a voltage range where batteries are used. For example, it is possible to use inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, and $LiC_nF_{2n+1}SO_3$ (2≤n≤7), $LiN(RfOSO_2)_2$ (where Rf is a fluoroalkyl group).

The concentration of these lithium salts in the non-aqueous electrolyte is preferably 0.5 to 2.0 mol/L, more preferably 0.9 to 1.5 mol/L.

There is no particular limitation with respect to the organic solvent used in the non-aqueous electrolyte as long as it can dissolve the above-listed lithium salts and does not cause a side reaction, such as decomposition, in a voltage range where batteries are used. Example thereof include: cyclic carbonates such as ethylene carbonate, propylene carbonate, and butylene carbonate; chain carbonates such as dimethyl carbonate, diethyl carbonate, and methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxy propionitrile; and sulfite esters such as ethylene glycol sulfite. These may also be used in a combination of two or more. A combination of the materials capable of achieving a high conductivity, e.g., a mixed solvent of ethylene carbonate and a chain carbonate is preferred for better characteristics of the battery.

Separator

It is preferable that the separator used for the non-aqueous electrolyte secondary battery of the present invention has the property (or in other words, a shutdown function) of closing the pores at a temperature of 80° C. or more (more preferably 100° C. or more) and 170° C. or less (more preferably 150° C. or less). It is possible to use a separator used for ordinary lithium ion secondary batteries and the like, including, for example, a microporous film made of polyolefin such as polyethylene (PE) or polypropylene (PP). The microporous film constituting the separator may be a microporous film using only PE or only PP, for example, or may be a laminate of a PE microporous film and a PP microporous film.

Configuration of Battery

Examples of the configuration of the non-aqueous electrolyte secondary battery of the present invention include a cylindrical form (e.g., rectangular cylindrical form, circular cylindrical form) in which a steel can, an aluminum can or the like is used as an outer can. It is also possible to use a laminated battery in which a laminated film on which a metal is vapor-deposited is used as an outer case.

EXAMPLES

Hereinafter, the present invention will be described in detail by way of examples. It should be noted, however, that the examples given below are not intended to limit the present invention.

Example 1

Synthesis of Lithium-Containing Composite Oxide

Ammonia water having a pH adjusted to approximately 12 by the addition of sodium hydroxide was placed in a reaction vessel. Under strong stirring, a mixed aqueous solution containing nickel sulfate, cobalt sulfate, and manganese sulfate at the respective concentrations of 2.10 mol/L, 0.84 mol/L, and 1.26 mol/L, and ammonia water having a concentration of 25 mass % were added dropwise thereto at rates of 23 $cm^3$/min and 6.6 $cm^3$/min, respectively, using a metering pump. After 80 hours from the dropwise addition, the slurry was filtrated, and dried at 100° C. for 24 hours to synthesize a coprecipitated compound (spherical coprecipitated compound) containing Ni, Co, and Mn. At this time, the temperature of the reaction solution was held at 50° C., and an aqueous sodium hydroxide solution having a concentration of 6.4 mol/L was also simultaneously added dropwise such that the pH of the reaction solution was maintained at around 12. Furthermore, a nitrogen gas was bubbled at a flow rate of 1 L/min.

The above coprecipitated compound was washed with water, filtrated and dried to give a hydroxide containing Ni, Co, and Mn at a molar ratio of 50:20:30. 0.196 mol of the hydroxide and 0.204 mol of $LiOH \cdot H_2O$ were dispersed in ethanol to form a slurry, and the slurry was then mixed for 40 minutes using a planetary ball mill and dried at room temperature to give a mixture. Then, the mixture was placed in an alumina crucible, heated to 600° C. in a dry air flow of 2 L/min, held at that temperature for two hours for preheating, and baked for 12 hours under an oxygen atmosphere by further increasing the temperature to 700° C., to synthesize a lithium-containing composite oxide. The resultant lithium-containing composite oxide was crushed in a mortar into powder, and thereafter stored in a desiccator.

As a result of determining the composition of the powder of the lithium-containing composite oxide using an atomic absorption spectrometer, the composition was found to be represented by $LiNi_{0.5}Co_{0.2}Mn_{0.3}O_2$.

In addition, the lithium-containing composite oxide was subjected to an X-ray diffraction measurement. Specifically, an X-ray diffraction measurement device "RINT-2500V/PC" manufactured by Rigaku Corporation was used to measure X-ray diffraction using CuKα radiation, and the obtained data was analyzed using analysis software "JADE" manufactured by Rigaku Corporation. Here, diffraction-line integrated intensities of the (003) plane and the (104) plane in the X-ray diffraction chart were taken as $I_{003}$ and $I_{104}$, respectively. $I_{003}$ and $I_{104}$ were obtained from the peak areas of their respective diffraction lines, and the ratio $I_{003}/I_{104}$ of the integrated intensities was determined by calculation. As a result, the ratio $I_{003}/I_{104}$ of the integrated intensities was 1.18.

In addition, the average particle size of the secondary particles of the lithium-containing composite oxide was measured by the above-described method, and D50 was found to be 5.7 μm.

Production of Positive Electrode 93.7 parts by mass of the lithium-containing composite oxide ($LiNi_{0.5}Co_{0.2}Mn_{0.3}O_2$) serving as the positive electrode active material, 4.0 parts by mass of acetylene black serving as the conductivity enhancing agent, 2.0 parts by mass of PVDF serving as the binder, and 0.3 parts by mass of PVP were mixed, and an appropriate amount of NMP was added thereto. All were mixed and dispersed using a planetary mixer to prepare a positive electrode material mixture-containing slurry. Then, the positive electrode material mixture-containing slurry was applied in a uniform thickness onto one side of a 15-μm-thick aluminum foil that serves as the positive electrode current collector, dried at 85° C., followed by vacuum drying at 100° C. Thereafter, the resulting structure was pressed with a roll pressing machine to produce a positive electrode including a positive electrode material mixture layer with a post-pressing thickness of 100 μm. Note that, when the positive electrode material mixture-containing slurry was applied onto the aluminum foil, a non-coated portion was formed such that a part of the aluminum foil was exposed.

Then, this positive electrode was cut to have an area of the positive electrode material mixture layer of 30 mm×30 mm and to include the exposed portion of the aluminum foil. Furthermore, an aluminum lead piece for extracting current was welded to the exposed portion of the aluminum foil to produce a lead-equipped positive electrode.

Production of Negative Electrode

An appropriate amount of water was added to a negative electrode material mixture composed of 48.9 parts by mass of natural graphite and 48.9 parts by mass of artificial graphite each serving as the negative electrode active material, 1.2 parts by mass of CMC serving as the binder, and 1.0 parts by mass of SBR, and all were mixed and dispersed using a planetary mixer to prepare a negative electrode material mixture-containing slurry. Then, the negative electrode material mixture-containing slurry was applied in a uniform thickness onto one side of a 8-μm-thick copper foil that serves as the negative electrode current collector, dried at 85° C., followed by vacuum drying at 100° C. Thereafter, the resulting structure was pressed with a roll pressing machine to produce a negative electrode including a negative electrode material mixture layer with a post-pressing thickness of 125 μm. Note that, when the negative electrode material mixture-containing slurry was applied onto the copper foil, a non-coated portion was formed such that a part of the copper foil was exposed.

Then, this negative electrode was cut to have an area of the negative electrode material mixture layer of 35 mm×35 mm and to include the exposed portion of the copper foil. Furthermore, a nickel lead piece for extracting current was welded to the exposed portion of the copper foil to produce a lead-equipped negative electrode.

Assembly of Battery

The lead-equipped positive electrode and the lead-equipped negative electrode were overlapped with each other with a PE microporous film separator (thickness 18 μm) disposed therebetween to form a laminated electrode assembly, and the laminated electrode assembly was accommodated in an outer case formed of an aluminum laminate film of 90 mm×160 mm. Subsequently, 1 mL of a non-aqueous electrolyte obtained by dissolving $LiPF_6$ at a concentration of 1.2 mol/L in a solvent in which ethylene carbonate and dimethyl carbonate were mixed at a volume ratio of 2:8 was injected into the outer case, followed by sealing the outer case to produce a laminated non-aqueous electrolyte secondary battery.

FIG. 1 shows a plan view of the laminated non-aqueous electrolyte secondary battery thus obtained. In FIG. 1, a laminated non-aqueous electrolyte secondary battery 1 of the present example is configured by accommodating a laminated electrode assembly and a non-aqueous electrolyte in an outer case 2 formed of an aluminum laminate film having a rectangular shape in plan view. Also, a positive electrode external terminal 3 and a negative electrode external terminal 4 are drawn from the same edge of the outer case 2.

Example 2

Production of Positive Electrode Active Material

A laminated non-aqueous electrolyte secondary battery was produced in the same manner as in Example 1 except that 100 parts by mass of the lithium-containing composite oxide ($LiNi_{0.5}Co_{0.2}Mn_{0.3}O_2$) synthesized in Example 1 and 0.3 parts by mass of 3-methacryloxypropyltrimethoxysilane serving as the organosilane compound were stirred in a planetary mixer for 30 minutes to produce a silane treated positive electrode material in which a coating layer of the organosilane compound was formed on the surface of the lithium-containing composite oxide, and this was used as the positive electrode active material.

Comparative Example 1

Synthesis of Lithium-Containing Composite Oxide

A lithium-containing composite oxide ($LiNi_{0.5}CO_{0.2}Mn_{0.3}O_2$) was produced in the same manner as in Example 1 except that a mixed aqueous solution containing nickel sulfate, cobalt sulfate, and manganese sulfate, and ammonia water were added dropwise to a reaction vessel, and the time elapsed after the dropwise addition to the filtration was 100 hours. As a result of measuring the ratio $I_{003}/I_{104}$ of the integrated intensities and the average particle size D50 of the secondary particles of the lithium-containing composite oxide in the same manner as in Example 1, the ratio $I_{003}/I_{104}$ of the integrated intensities was 1.16, and D50 was 9.8 μm.

A laminated non-aqueous electrolyte secondary battery was produced in the same manner as in Example 1 except that the lithium-containing composite oxide was used as the positive electrode active material.

Comparative Example 2

Synthesis of Lithium-Containing Composite Oxide

A lithium-containing composite oxide ($LiNi_{0.5}Co_{0.2}Mn_{0.3}O_2$) was produced in the same manner as in Example 1 except that a mixed aqueous solution containing nickel sulfate, cobalt sulfate, and manganese sulfate, and ammonia water were added dropwise to a reaction vessel, and the time elapsed after the dropwise addition to the filtration was 120 hours. As a result of measuring the ratio $I_{003}/I_{104}$ of the integrated intensities and the average particle size D50 of the secondary particles of the lithium-containing composite oxide in the same manner as in Example 1, the ratio $I_{003}/I_{104}$ of the integrated intensities was 1.15, and D50 was 14.4 μm.

A laminated non-aqueous electrolyte secondary battery was produced in the same manner as in Example 1 except that the lithium-containing composite oxide was used as the positive electrode active material.

Comparative Example 3

Synthesis of Lithium-Containing Composite Oxide

A lithium-containing composite oxide ($LiNi_{0.5}Co_{0.2}Mn_{0.3}O_2$) was produced in the same manner as in Example 1 except that a raw material mixture of the lithium-containing composite oxide was prepared in the same manner as in Example 1, the mixture was subjected to preheating in the same manner as in Example 1, and thereafter baked in an ambient atmosphere for 12 hours by increasing the temperature to 700° C. As a result of measuring the ratio $I_{003}/I_{104}$ of the integrated intensities and the average particle size D50 of the secondary particles of the lithium-containing composite oxide in the same manner as in Example 1, the ratio $I_{003}/I_{104}$ of the integrated intensities was 1.06, and D50 was 5.7 μm.

A laminated non-aqueous electrolyte secondary battery was produced in the same manner as in Example 1 except that the lithium-containing composite oxide was used as the positive electrode active material.

Next, the laminated non-aqueous electrolyte secondary batteries of Examples 1 and 2 and Comparative Examples 1 to 3 were evaluated for the following characteristics.

Evaluation of High-Output Charge/Discharge Characteristics

The batteries were subjected to constant current charging at a current value of 2 C (64 mA) until the voltage reached to 4.2 V, and further subjected to constant voltage charging at 4.2 V until the charge current reached 6.4 mA, followed by discharging under predetermined conditions. This series of operations was taken as one cycle of charging/discharging, and two cycles were performed. The discharging was performed until the voltage reached 2.5 V, with the current value at the first cycle set to 6.4 mA and the current value at the second cycle set to 64 mA. Then, the discharge capacity at a current value of 6.4 mA was taken as 100%, and the ratio of the discharge capacity at a current value of 64 mA to that discharge capacity was expressed in percentage, and thus calculated as the rate of 2 C discharge capacity.

Evaluation of Charge/Discharge Cycle Characteristics

The batteries were subjected to constant current charging at a current value of 2 C (64 mA) until the voltage reached 4.2 V, and further subjected to constant voltage charging at 4.2 V until the charge current reached 6.4 mA, followed by discharging under the condition of a current value of 64 mA until the voltage reached 2.5 V. This series of operations was taken as one cycle, and 200 cycles were performed. Then, the discharge capacity at the first cycle was taken as 100%, and the ratio of the discharge capacity at the 200th cycle to that discharge capacity was expressed in percentage, and thus calculated as the rate of cycle capacity retention.

Evaluation of Storage Characteristics

The batteries were first subjected to constant current charging at a current value of 32 mA until the voltage reached 4.2 V, and further subjected to constant voltage charging at 4.2 V until the charge current reached 3.2 mA, followed by constant current discharging at 32 mA until the voltage reached 2.5 V. The discharge capacity obtained at that time was taken as a pre-storage discharge capacity (100%). Then, the batteries were subjected to constant current charging at a current value of 32 mA until the voltage reached 4.2 V, and further subjected to constant voltage charging at 4.2 V until the charge current reached 3.2 mA, followed by storage for 30 days in a constant-temperature bath maintained at 60° C. After storage, the batteries were subjected to constant current discharging at 32 mA until the voltage reached 2.5 V, then again subjected to constant current charging at 32 mA until the voltage reached 4.2 V, and further subjected to constant voltage charging at 4.2 V until the charge current reached 3.2 mA, followed by constant current discharging at a 32 mA until the voltage reached 2.5 V. The discharge capacity obtained at that time was determined as a post-storage discharge capacity. Finally, the ratio of the post-storage discharge capacity to the pre-storage discharge capacity (100%) was expressed in percentage, and thus calculated as the rate of capacity recovery after storage.

Figure 2:
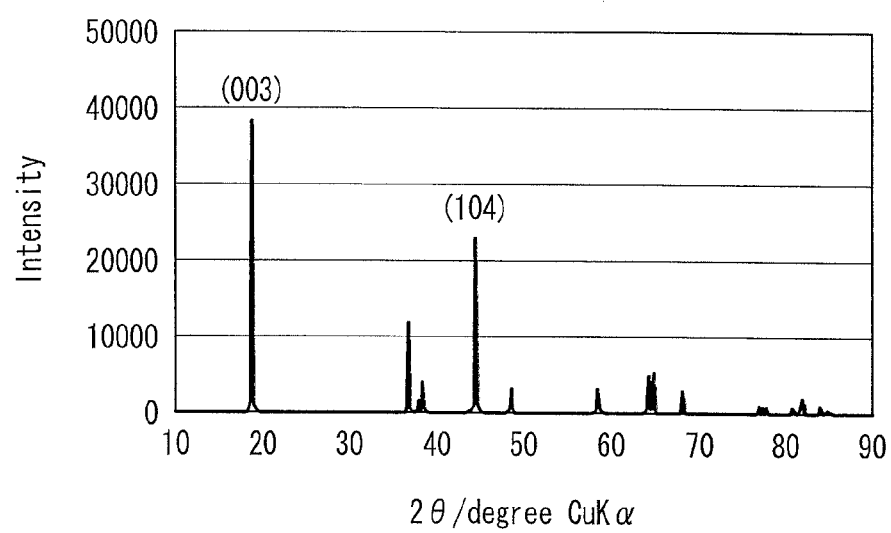
FIG. 2 shows an X-ray diffraction chart of a positive electrode material mixture layer used in Example 1.

The results of the above-described evaluations are shown in Table 1. Table 1 also shows the average secondary particle size of the positive electrode active material, the ratio $I_{003}/I_{104}$ of the integrated intensities in the X-ray diffraction chart of the positive electrode material mixture layer, and whether or not silane treatment was performed. In addition, the X-ray diffraction chart of the positive electrode material mixture layer used in Example 1 is shown in FIG. 2.

TABLE 1

|  | Average secondary particle size (μm) | Ratio $I_{003}/I_{104}$ of integrated intensities | Silane treatment | Rate of 2 C discharge capacity (%) | Rate of cycle capacity retention (%) | Rate of capacity recovery after storage (%) |
| --- | --- | --- | --- | --- | --- | --- |
| Example 1 | 5.7 | 1.18 | Not performed | 87 | 94 | 78 |
| Example 2 | 5.7 | 1.18 | Performed | 86 | 96 | 84 |
| Com. Ex. 1 | 9.8 | 1.16 | Not performed | 80 | 74 | 77 |
| Com. Ex. 2 | 14.4 | 1.15 | Not performed | 75 | 56 | 77 |
| Com. Ex. 3 | 5.7 | 1.06 | Not performed | 84 | 82 | 74 |

It can be seen from Table 1 that Example 1 of the present invention can achieve a high value for all of the rate of 2 C discharge capacity, the rate of cycle capacity retention, and the rate of capacity recovery after storage. Furthermore, it can be seen that Example 2, in which the silane treated positive electrode active material was used, further can enhance the rate of capacity recovery after storage as compared to Example 1.

On the other hand, Comparative Examples 1 and 2, in which the average particle size of the positive electrode active material is greater than 6 μm, and Comparative Example 3, in which the ratio $I_{003}/I_{104}$ of the integrated intensities in the X-ray diffraction chart of the positive electrode material mixture layer is less than 1.1, exhibited a lower value for all of the rate of 2 C discharge capacity, the rate of cycle capacity retention, and the rate of capacity recovery after storage, as compared to Examples 1 and 2.

The invention may be embodied in other forms without departing from the spirit of essential characteristics thereof. The embodiments disclosed in this application are to be considered as illustrative and not restrictive. The scope of the present invention should be construed in view of the appended claims, rather than the foregoing description, and all changes that come within the meaning and range of equivalency of the claims are intended to be embraced therein.

DESCRIPTION OF REFERENCE NUMERALS

1 Laminated non-aqueous electrolyte secondary battery
2 Outer case
3 Positive electrode external terminal
4 Negative electrode external terminal

The invention claimed is:

1. A non-aqueous electrolyte secondary battery comprising a positive electrode, a negative electrode, a non-aqueous electrolyte, and a separator,
  wherein the positive electrode comprises a positive electrode current collector and a positive electrode material mixture layer formed on one or both sides of the positive electrode current collector,
  the positive electrode material mixture layer has a thickness of 100 μm or more and 300 μm or less per side of the positive electrode current collector,
  the positive electrode material mixture layer includes a positive electrode active material,
  the positive electrode active material comprises a lithium-containing composite oxide obtained by baking under an oxygen gas atmosphere after preheating,
  the lithium-containing composite oxide is represented by a general compositional formula: $Li_{1+x}MO_2$,
  where x is in the range of $-0.5 \leq x \leq 0.5$, and M comprises Ni and at least one selected from Co and Mn,
  $20 \leq a < 100$ and $50 \leq a+b+c \leq 100$ are satisfied when the ratios of Ni, Co, and Mn to all the elements constituting M are a, b, and c, respectively, in units of mol %, and
  the ratio of elements other than Ni, Co, and Mn to all the elements constituting M is 2.0 mol % or less,
  the positive electrode active material is composed of secondary particles formed by aggregation of primary particles,
  an average particle size of the secondary particles is 6 μm or less,
  when an average particle size of the primary particles is A and the average particle size of the secondary particles is B, A/B is 0.1 or less,
  when diffraction-line integrated intensities of a (003) plane and a (104) plane in an X-ray diffraction chart of the positive electrode material mixture layer are $I_{003}$ and $I_{104}$, respectively, the ratio $I_{003}/I_{104}$ of the integrated intensities is 1.1 or more,
  the positive electrode material mixture layer contains an organosilane compound represented by a general formula $X^1$—$Si(OR^1)_3$ or $X^2$—$SiR^2(OR^2)_2$, where $R^1$, $R^2$, and $R^3$ represent —$CH_3$, —$C_2H_5$, or —$C_3H_7$, $R^2$ and $R^3$ may be the same or different, and $X^1$ and $X^2$ are selected from the group consisting of a vinyl group, an epoxy group, a styryl group, a methacryloxy group, an acryloxy group, an amino group, a ureido group, a chloropropyl group, a mercapto group, a sulfide group, and an isocyanate group, and
  the organosilane compound content is 0.05 to 3.0 mass % relative to the total mass of the positive electrode material mixture layer.

2. The non-aqueous electrolyte secondary battery according to claim 1,
  Wherein the lithium-containing composite oxide contains, as constituent elements, nickel and at least one selected from cobalt and manganese and has a layered structure.

* * * * *